United States Patent [19]

Minagawa

[11] 4,269,891

[45] May 26, 1981

[54] RECORDING SHEET FOR INK JET RECORDING

[75] Inventor: Nobuhiko Minagawa, Fujinomiya, Japan

[73] Assignee: Fuji Photo Film Co., Ltd., Minami-ashigara, Japan

[21] Appl. No.: 52,893

[22] Filed: Jun. 28, 1979

[30] Foreign Application Priority Data

Jun. 28, 1978 [JP] Japan .................................. 53/78315

[51] Int. Cl.[3] ........................ B32B 5/16; G01D 15/34

[52] U.S. Cl. ................................ 428/335; 346/135.1; 427/146; 428/207; 428/211; 428/328; 428/330; 428/331; 428/336; 428/337; 428/409; 428/452; 428/454

[58] Field of Search .......................... 106/20; 427/146; 428/206, 207, 211, 409, 914, 323, 328, 330, 331, 335–339, 452, 454; 346/135.1

[56] References Cited

U.S. PATENT DOCUMENTS 3,889,270 6/1975 Hoffman et al. ........................ 427/12

OTHER PUBLICATIONS

*Pigment Handbook*, vol. II, pp. 205–213, A Wiley Interscience Publication (1973).

*Advance in Printing Science and Technology*, vol. 4, pp. 77–88 and pp. 405–437, Pergamon Press (1967).

*Primary Examiner*—Bruce H. Hess

*Attorney, Agent, or Firm*—Sughrue, Rothwell, Mion, Zinn and Macpeak

[57] ABSTRACT

A recording sheet comprising a support and an ink absorbing layer provided thereon, said recording sheet having a degree of opacity ranging from 55.0% to 97.5% and said ink absorbing layer having an ink absorbing power of about 1.5 mm per minute to 18.0 mm per minute, which is useful in an ink jet recording process and images and characters recorded thereon can be clearly seen by both reflected and transmitted light.

11 Claims, No Drawings

RECORDING SHEET FOR INK JET RECORDING

BACKGROUND OF THE INVENTION

1. Field of the Invention

The present invention relates to a recording sheet suitable for use in an ink jet recording process and particularly to a sheet in which the images and characters recorded thereon can be clearly observed by both reflected and transmitted light.

2. Description of the Prior Art

Recently, ink jet recording processes have become extremely popular in the data processing art and one of their most frequent applications is with computer print outs. Ink jet recording is so well accepted because it is not accompanied by large amounts of noise and it is capable of printing at high speeds. In addition, the quality of the images produced in a multicolor ink jet process is comparable to the images produced in a conventional multicolor printing process and they equal the quality of color photographic images in terms of the size of images. Regarding expense, copies can be made at a lower price in the multicolor ink jet process as compared to the multicolor printing process if the number of copies is few, to say nothing of the color photographic process.

Attempts have been made to use the records obtained by the ink jet process in exhibitions without restricting the use of the ink jet process to only recording purpose. There are basically two forms of display: a so-called reflection form in which images formed on a sheet such as paper or the like are observed from the image side and a so-called transmission form in which a light source is placed behind the image bearing sheet and the images are observed from the image side by light transmitted through the sheet. It has been known that images can be more clearly seen by using the latter form of observation under particular conditions such as in a dark room, in the open air at night and the like. As a prevailing example of the latter display form, mention may be made of the case that a number of fluorescent lamps are arranged behind a large size transparent positive photograph and fixed on an interior wall of a room.

The display form is selected depending upon the circumstances under which exhibition is to take place. However, if images of good quality could be observed in each instance, images on one sheet could be applied in both reflection and transmission displays. Such display sheet is well suited for image observation in places in which the amount of light varies over a broad range. However, experience has shown that it is very difficult to prepare on one sheet images which have desirable color density and which can be clearly observed in both reflection and transmission displays. That is to say, when images of the type which can be observed with moderate density by reflection are observed by means of transmitted light, they are so obscure and have such low density that they cannot be seen. On the other hand, in case of observing images best suited for the transmission forms by means of reflected light, the images have such high color density and they are so dark that they cannot be employed as exhibits.

It has been found that the fact that the dye images exist only as a very shallow layer in the vicinity of the surface of a sheet, as observed in the case of multicolor prints and color photographs, is the reason that images of moderate density cannot be observed on one common sheet by both reflection and transmission at the same time. It has also been found that it is possible to observe images clearly on one common sheet by both reflection and transmission forms when the image is formed on a sheet possessing certain, particular properties in accordance with an ink jet process, such that the image is produced in such a manner that the dye images are formed in a desired depth. The above-described particular properties include moderate opacity and moderate ink absorbing power.

SUMMARY OF THE INVENTION

Accordingly, an object of the present invention is to provide a sheet which possesses such opacity and ink absorbing power that images formed thereon by an ink jet recording process can be clearly observed by both reflected and transmitted light.

The above-described object is attained with a sheet which is constructed of a support and an ink absorbing layer, which sheet is adjusted to have a degree of opacity of about 55.0% to 97.5% and which ink absorbing layer is adjusted to have ink absorbing power of from 1.5 mm per minute to 18.0 mm per minute. Such a sheet is highly useful, particularly in multicolor ink jet recording.

DETAILED DESCRIPTION OF THE INVENTION

The ink jet recording sheet of the present invention comprises an ink absorbing layer provided on a support. Suitable supports include paper, a thermoplastic resin film or the like.

There is no special limitation on the thickness and mixing ratios among the different kinds of pulps in the papers suitable for use in the present invention, but the paper should be selected so that the degree of opacity measured in a form of an ink jet recording sheet, in which that of the ink absorbing layer is included, is not outside the range of about 55.0% to 97.5%. In general, examples of pulps include bleaching processed Laubholz Bleached Kraft Pulp (LBKP), Laubholz Bleached Sulfite Pulp (LBSP), Nadelholz Bleached Kraft Pulp (NBKP) and Nadelholz Bleached Sulfite Pulp (NBSP). A preferred paper thickness is from 30 $\mu$m to 150 $\mu$m. However, one skilled in the art will appreciate that even papers having thicknesses outside this range are suitable.

There is no special limitation on the quality of the thermoplastic films used in the present invention. In general, polyester (e.g., polyethylene terephthalate such as Mylar 400PB manufactured by E. I. du Pont), polystyrene, polyvinyl chloride, polymethylmethacrylate, cellulose acetate and the like can be employed. These thermoplastic films may be transparent films free from solid pigments, or opaque films in which white pigments are charged or fine bubbles are formed. A number of white pigments such as titanium oxide, calcium sulfate, calcium carbonate, silica, clay, talc, etc., may also be incorporated therein. Though the thickness of the thermoplastic resin film is not restricted to any special range, most of the resin films generally employable have a thickness of from about 10 $\mu$m to 200 $\mu$m.

An ink absorbing layer provided at the surface of the ink jet recording sheet of the present invention is composed of white pigment having ink absorbing ability and a binder resin possessing a film forming property which holds the white pigment in the layer. Ink absorbing layers are disclosed in *Pigment Handbook,* Vol. II, pp.

205-213, A Wiley Interscience Publication (1973) and *Advance in Printing Science and Technology*, Vol. 4, pp. 77-88 and pp. 405-437, Pergamon Press (1967). The weight ratio of a suitable pigment to binder in the ink absorbing layer is about 0.2 to 10 and preferably about 1.0 to 5.0. Generally the ink absorbing layer is about 5 to 50 μm thick although one skilled in the art will recognize that thicknesses outside this range are operable.

Specific examples of white pigments useful in the ink absorbing layer include clay, talc, diatomaceous earth, calcium carbonate, calcium sulfate, barium sulfate, titanium oxide, zinc oxide, zinc sulfide, satin white (3 CaO.$Al_2O_3$.3 $CaSO_4$.3 $H_2O$), aluminum silicate ($Al(AlSiO_5)$), lithopone (a mixture of 28% zinc sulfide and 72% barium sulfate), etc. Also, a urea-formalin resin powder can be used although such is not a preferred pigment. These pigments may be used individually or in combinations of two or more.

Specific examples of the binder resins used in the ink absorbing layer include oxidized starch, etherified starch, gelatin, casein, carboxymethylcellulose, hydroxyethylcellulose, polyvinyl alcohol, SBR latex polyvinyl acetate emulsion and so on. The ink absorbing layer is made by coating an aqueous solution containing the above-described white pigment(s) and binder(s) on the surface of paper or the above-described thermoplastic resin film support.

It is essential for the ink jet recording sheet of the present invention to possess the degree of opacity of from about 55.0% to 97.5%. That is, the combined degrees of opacity of the paper or thermoplastic resin film support and the ink absorbing layer must fall within the aforesaid range.

The measurement of the degree of opacity in the present invention is carried out in accordance with JIS-P8138-1976 using a Hunter multipurpose reflectometer (manufactured by Toyo Seiki Seisakusho Co., Ltd.) in the following manner. A sheet to be examined is superposed on a standard black plate attached to the Hunter multipurpose reflectometer and the reflectance of white light from the surface of the sheet is measured. The value obtained is taken as $R_o$. Then, the same sheet is put on a standard white plate made of aluminum oxide attached to the Hunter multipurpose reflectometer and the reflectance of white light from the surface of the sheet is measured. The value obtained is taken as R. The degree of opacity is determined using the thus-obtained values $R_o$ and R according to the following equation:

$$C\ (\text{degree of opacity}) = (R_o/R \times 100(\%)$$

If the degree of opacity is below about 55.0%, white image areas observed by reflection do not exhibit the desirable whiteness and further the colored image areas also do not exhibit clear color tone. On the other hand, when the degree of opacity is above about 97.5%, images observed by transmission become dark as a whole and consequently the images lack brilliancy. Thus, if the degree of opacity of the sheet used deviates from the range of about 55.0% to 97.5%, images desirable for exhibition cannot be obtained. A more preferable degree of opacity is from about 65.0% to 95.0%. An additional point, the degree of opacity of the sheet corresponds to the sum total of the degree of opacity of the support used and of the ink absorbing layer, and there is no particular restrictions on the ratio of the degree of opacity of the former to that of the latter.

The absorbing power of the ink absorbing layer is evaluated by the following procedure. First, one side of a polyester film 150 μm thick is rendered hydrophilic by subjecting it to a corona discharging treatment. Then, the coating whose absorbing power is to be evaluated is provided on the surface of the polyester film at a dry coverage of 10±1 μm. The thus-obtained sheet is cut into pieces 1 cm wide and 10 cm long to prepare test samples. Next, for the absorption power measurement a test sample is allowed to stand for 12 hours or longer in a room in which the temperature and the relative humidity are regulated at 20° to 23° C. and at 60 to 65% RH. Then, the test sample is stood in water, which is placed in a glass container and warmed to 20° to 23° C., so that ⅓ of the sample in the lengthwise direction is soaked. Under such condition, the rate of permeation of the water into the coated layer is observed by the naked eye. More specifically, the time from the moment the sample is soaked in the water until the water rises 5 mm in the coated layer is measured by means of a stopwatch. The rate measured (mm/min) is taken as the ink absorbing power of the sample. On the occasion that the support for the recording sheet is a synthetic resin film, that does not absorb water, the water absorbing power of the ink absorbing layer can be measured using the sheet itself in the above-described testing manner.

The absorbing power possessed by the ink absorbing layer in the present invention is from about 1.5 mm/min to 18.0 mm/min on a basis of water permeation rate determined by the above-described process. More preferably the absorbing power is from about 2.0 mm/min to 15.0 mm/min. In case of absorbing power under about 1.5 mm/min, dye images are formed only in the vicinity of the surface area of the ink absorbing layer and, therefore, the difference between the color density under reflected light and the color density under transmitted light becomes great, and such a sheet cannot be used for both observation by reflected and transmitted light. On the other hand, in case of the absorbing power above about 18.0 mm/min, the clearness of image observed by reflected light is insufficient.

In the present invention, the thickness of the ink absorbing layer is not critical. However, a thickness of at least about 3 μm is required to attain favorable ink absorbing power. There is no special restriction on the upper limit of the thickness, but the thickness should be adjusted taking account the degree of opacity of the sheet so that it is not over 97.5%, as described above.

In exhibition materials obtained by forming images using an ink jet process on the particular sheet prepared in accordance with the present invention, there exists only a slight difference in the color density of images observed by reflected and transmitted light and images clear enough to be suitable for practical use are obtained in each case.

The present invention will now be illustrated in greater detail by reference to the following examples. Unless otherwise indicated, all parts, percents, ratios, etc., are by weight.

EXAMPLE 1

On one side of a paper prepared from 50 wt% of LBKP and 50 wt% of NBKP so as to have a pulp composition exhibiting a beating degree of 63° (which was determined by means of Schopper-Riegler's meter) and a thickness of 50 μm, the following coating solution was coated at a dry coverage of 15 μm to make an ink absorbing layer.

| Ink Absorbing Layer Composition | |
|---|---|
| Talc | 180 g |
| Oxidized Starch | 36 g |
| Water | 500 cc |

The sheet obtained had the degree of opacity of 93.5%. On the other hand, the water permeation rate was measured as described above in order to determine the absorbing power which was 3.5 mm/min.

Thus, the obtained sheet was cut into pieces 72.8 cm long and 103.0 cm wide and thereon images were drawn using four inks, namely, a red, blue, yellow and black ink, in accordance with an ink jet process. Thus, a poster for exhibition was prepared. This poster exhibited satisfactory clarity not only under daylight and electric lamplight but also when six 30 watt fluorescent lamps were arranged behind the poster and they were lighted in a dark room.

COMPARISON EXAMPLE 1

On the surface of a paper prepared in the same manner as in Example 1, the following coating composition was coated at a dry coverage of 15 μm to prepare an ink absorbing layer.

| Ink Absorbing Layer Composition | |
|---|---|
| Talc | 180 g |
| Polyvinyl Acetate Emulsion (containing 50 wt% solids) | 80 cc |
| Water | 450 cc |

The sheet obtained had the degree of opacity of 92.0% and the ink absorbing power of 1.1 mm/min. On this sheet, a tetrachromatic image was drawn utilizing an ink jet in the same manner as in Example 1. The thus-obtained poster exhibited optimum color density when observed by reflected light, but in the case of transmitted light the color density was too low to make the sheet useful as an exhibit.

EXAMPLE 2

One surface of a biaxially stretched polyester film 120 μm thick was subjected to a corona discharge treatment using an I-type corona discharge apparatus manufactured by Lepel Co. and a coating solution having the following composition was coated thereon immediately at a dry coverage of 28 μm.

| Ink Absorbing Layer Composition | |
|---|---|
| Aluminum Silicate | 150 g |
| Gelatin | 60 g |
| Water | 500 cc |

The sheet obtained had the degree of opacity of 66.5% and the ink absorbing power of 9.4 mm/min. A poster obtained by drawing an image on this sheet using a multicolor ink jet was clear and exhibited good color density upon observation by reflected and transmitted light.

COMPARISON EXAMPLE 2

A sheet was prepared in the same manner as in Example 2 except that the coverage of the ink absorbing layer was reduced to 15 μm. This sheet had a degree of opacity of 48.6%. On this sheet an image was drawn using a multicolor ink jet. The thus-obtained image was dark in white areas and lacked brilliancy and was inadequate for practical use.

EXAMPLE 3

A synthetic paper having a thickness of 110 μm and the degree of opacity of 88.6% in which mat layers containing clay as a main component were provided on both sides of a polystyrene film was employed as a support and thereto a coating solution having the following composition was applied at a dry coverage of 10 μm to prepare an ink absorbing layer.

| Ink Absorbing Layer Composition | |
|---|---|
| Calcium Carbonate | 100 g |
| Carboxymethylcellulose | 20 g |
| Water | 320 cc |

The sheet obtained had the degree of opacity of 92.3% and the ink absorbing power of 15.0 mm/min. A poster made by drawing image on this sheet using multicolor ink jet could be seen clearly upon observation under reflected and transmitted light.

COMPARISON EXAMPLE 3

On one side of the synthetic paper made in the same manner as in Example 3, a coating solution having the following composition was coated at a dry coverage of 30 μm.

| Ink Absorbing Layer Composition | |
|---|---|
| Urea-Formalin Resin Powder | 100 g |
| Oxidized Starch | 20 g |
| Water | 320 cc |

The sheet obtained had a degree of opacity of 96.1% and the ink absorbing power of 20.8 mm/min. Images drawn on this sheet using multicolor ink jet had favorable color density and could be seen clearly under transmitted light but they had low color density and could not be seen clearly under reflected light. In the latter case, the images were markedly inferior to those on posters made by multicolor printing.

While the invention has been described in detail and with reference to specific embodiments thereof, it will be apparent to one skilled in the art that various changes and modifications can be made therein without departing from the spirit and scope thereof.

What is claimed is:

1. An ink jet recording sheet which can be viewed under both reflected and transmitted light comprising a support and an ink absorbing layer provided thereon comprising a white pigment having ink adsorbing ability and a binder resin possessing film forming ability, wherein the weight ratio of white pigment to binder resin is about 0.2 to 10, the degree of opacity of said sheet being about 55.0 to 97.5% and the ink absorbing power of said ink absorbing layer being about 1.5 to 18.0 mm/min.

2. The ink jet recording sheet of claim 1, wherein the degree of opacity is about 65.0 to 95.0%.

3. The ink jet recording sheet of claim 1, wherein the ink absorbing power is about 2.0 mm/min to 15.0 mm/min.

4. The ink jet recording sheet of claim 4, wherein said white pigment is clay, talc, diatomaceous earth, calcium carbonate, calcium sulfate, barium sulfate, titanium oxide, zinc oxide, zinc sulfide, satin white, aluminum silicate, or lithopone.

5. The ink jet recording sheet of claim 4, wherein said binder is oxidized starch, etherified starch, gelatin, casein, carboxymethylcellulose, hydroxyethylcellulose, polyvinyl alcohol, or SBR latex.

6. The ink jet recording sheet of claim 1, wherein said support is paper or a thermoplastic resin film.

7. The ink jet recording sheet of claim 6, wherein said paper is 30 to 150 μm thick.

8. The ink jet recording sheet of claim 7, wherein said support is said thermoplastic resin film.

9. The ink jet recording sheet of claim 8, wherein said thermoplastic resin film is about 10 to about 20 μm thick.

10. The ink jet recording sheet of claim 1, wherein said ink absorbing layer is at least about 3 μm thick.

11. The ink jet recording sheet of claim 9, wherein said ink absorbing layer is about 5 to about 50 μm thick.

* * * * *